United States Patent
Makarov

(10) Patent No.: US 6,289,671 B1
(45) Date of Patent: Sep. 18, 2001

(54) PLUG FOR A LIQUID-PROPELLANT ROCKET ENGINE CHAMBER

(75) Inventor: Matvei Mikhailovich Makarov, Khimki (RU)

(73) Assignee: Otkrytoe Aktsionernoe Obschestvo "Nauchno-Proizvodstvennoe Obiedinenie "Energomash" Imoni Akademika Kaksolmika V.P. Glushko" (RU)

( * ) Notice: Subject to any disclaimer, the term of this patent is extended or adjusted under 35 U.S.C. 154(b) by 0 days.

(21) Appl. No.: 09/377,855

(22) Filed: Aug. 20, 1999

(30) Foreign Application Priority Data

Feb. 23, 1999 (RU) ................................................ 99103515

(51) Int. Cl.⁷ ...................................................... F02K 1/00
(52) U.S. Cl. ................................. 60/271; 60/223; 60/259; 60/39.091; 60/257
(58) Field of Search ............................. 60/271, 263, 253, 60/223, 259

(56) References Cited

U.S. PATENT DOCUMENTS

| | | |
|---|---|---|
| 3,020,710 | 2/1962 | Herzog . |
| 3,372,548 * | 3/1968 | Mathis et al. ........................ 60/271 |
| 3,390,529 | 7/1968 | Pel et al. . |
| 3,693,831 | 9/1972 | West . |
| 5,165,229 * | 11/1992 | Svejkovsky ........................ 60/271 |

* cited by examiner

Primary Examiner—Charles G. Freay
Assistant Examiner—Ed Hayes
(74) Attorney, Agent, or Firm—Banner & Witcoff, Ltd.

(57) ABSTRACT

Plugs for protecting internal spaces of rocket combustion chambers against moisture, dust, and other environmental factors. Each plug includes a central rod with a bracket fastened to it. The plug also includes a sleeve with radially extending structural ribs. Spring-loaded cams with rollers are securely hinged at the ends of the ribs. In addition, a spring-loaded limiter and a valve are mounted on the central rod so that they can possibly move relative to the central rod. The limiter includes a sleeve and a conical shell that are connected by rod ties. The valve includes a metal stamped conical plate that forms a gas-tight fit with the rod. A sealing ring of elastic material is positioned on a peripheral part of the plate. The set of spring-loaded cams and the limiter secure the self-mounting plug in a working position and make the valve operation independent of the operation of other plug components.

14 Claims, 1 Drawing Sheet

PLUG FOR A LIQUID-PROPELLANT ROCKET ENGINE CHAMBER

FIELD OF THE INVENTION

The present invention relates to rocket engineering, in particular to plugs protecting the internal cavities of rocket engine chambers against the ingress of moisture, dust and other substances from the environment.

BACKGROUND OF THE INVENTION

Plugs are known from prior art that are mounted in a critical throat section of a chamber during storage of an engine.

Thus, for example, a blow-out plug according to U.S. Pat. No. 3,020,710 is made of synthetic rubber having high insulating properties. The plug is bonded in the portion located downstream of the nozzle throat section of a solid-propellant rocket engine.

A special covering is applied in the region where the plug is bonded to the nozzle. On an electric signal, the plug is separated along a thinned place by gas pressure, and the remaining part of the plug is burned out.

A disadvantage of this plug is that it is not dismountable during maintenance work.

Furthermore, during the process of engine storage it is often necessary to release the gases from the internal cavity of the combustion chamber.

This plug does not provide for the release of gases from the internal cavity of the combustion chamber, and this may result in a dangerous increase of the positive pressure in the internal cavity of the chamber during the process of engine storage.

A plug is also known from U.S. Pat. No. 3,390,529, which is mounted in the nozzle throat section of a rocket engine chamber. The attachment and sealing are provided by supplying a gaseous product into the internal cavity of the plug. Two valves are mounted on the plug, one of which makes it possible to maintain the pressure inside the chamber, and the other makes it possible to maintain the pressure inside the plug itself. One of the valves makes it possible to release the positive pressure from the internal cavity of the chamber.

The plug is blown out due to the pressure drop.

The construction of this plug is complex and it is heavy, which does not make it possible to effectively use it in this field of engineering.

A nozzle plug of a rocket engine chamber is known from U.S. Pat. No. 3,693,831. The plug is mounted in the nozzle throat section of the rocket engine chamber.

The plug is made of plastic in the form of a stopper of corresponding shape, wherein an annular groove is made in the stopper with an annular sealing element inserted in the groove. The sealing element is connected by a tube to an air source under pressure. A channel is made along the plug axis, and a metal tube (rod) is placed in this channel with a release valve mounted at the outlet thereof. When air under pressure is fed to the sealing element, the plug seals the chamber along the mating surfaces.

Vapors of the fuel and oxidizer are released from the internal cavity of the chamber by means of a release valve.

Such a system for removing the fuel and oxidizer vapors is ineffective because rapid blowing of the chamber is not possible.

This may also result in a dangerous increase of the positive pressure in the internal cavity of the chamber during storage of the engine.

Moreover, the known construction of the plug does not provide a guarantee that the plug will be blown out of the chamber at small pressure drops.

Furthermore, this system does not ensure the blowing of the chamber with gas at low pressure before the engine starts.

Finally, it is very difficult to produce the known plug with identical blow-out parameters.

The latter is especially important for the chambers of a multichamber LRE, where it is necessary to simultaneously blow out the plugs at the moment of engine start.

SUMMARY OF THE INVENTION

The object of the invention is to create a plug for the chamber of a liquid-propellant rocket engine, which plug would have a small weight and simple construction.

The next object of the invention is to create a plug for the chamber of a liquid-propellant rocket engine, which could be demounted during maintenance work.

One more object of the invention is to create a plug for the chamber of a liquid-propellant rocket engine with an effective system for removing the fuel and oxidizer vapors from the internal cavity of the chamber in the process of engine storage.

A further object of the invention is to create a plug for the chamber of a liquid-propellant rocket engine, which would ensure the guaranteed blowing of the chamber with gas at small pressure drops.

One more object of the invention is to provide the possibility of preparing several plugs with substantially identical parameters.

Finally, the last object of the invention is to create a plug for a chamber of a liquid-propellant rocket engine, which would ensure enhancement of the operating characteristics of a plug for an LRE chamber.

The aforesaid objects according to a first aspect of the invention are achieved by means of a plug for a liquid-propellant rocket engine chamber, the plug comprising: an axial rod having a first end with a stopper and a second end, wherein the rod is positioned substantially along the longitudinal axis of the plug; valve means mounted on the rod with the possibility of sliding from a closed position, in which the chamber is closed, to an open position in which the chamber is open for passage of a fluid medium from the chamber; a first spring means positioned on the rod between the valve means and the stopper and interacting with the valve means and with the stopper; stop means mounted on the rod downstream of the valve means in the direction towards the second end of the rod with the possibility of sliding from a stop position in which the stop means interacts with walls of the chamber to a free position in which the stop means is free from interaction with the walls of the chamber; a second spring means positioned on the rod between the valve means and the stop means and interacting with the valve means and with the stop means; means for tracking the wall profile of the chamber, the means stationarily fixed on the rod adjacent the second end of the rod, wherein the means for tracking is in constant interaction with the chamber walls and is disposed with the possibility for interaction with the stop means; a sleeve of the tracking means, which is stationarily fixed on the rod and is provided with a plurality of structural ribs directed in a radial direction from the sleeve; a plurality of levers of the tracking means, each lever having a first end, a second end and a middle portion, the middle portion of each lever hinge secured on an end of a corresponding structural rib of the sleeve, while the first end of each lever is provided with a roller and is positioned with the possibility for contact of the roller with a wall of the chamber; a plurality of spring means of the tracking means, each of which has a first end secured to the sleeve, and a second end secured to the second end of a corresponding lever of the tracking means for contact of the roller with a wall of the chamber.

In a particularly preferable embodiment of the invention, the valve means comprises a spacer, mounted on the rod with the possibility of sliding, and a substantially conical plate secured on the spacer, wherein the peripheral section of the plate comprises a seal.

In order to enhance the efficiency of operation of the valve means, the seal is made in the form of a ring of elastic material, which is secured with interference on the peripheral section of the plate.

It is desirable that rubber be selected as the elastic material of the seal.

The plate may be made from metal, and also it may be produced by stamping.

In a preferred embodiment of the invention, the stop means may comprise a cross slide, mounted with the possibility of sliding on the rod, and a substantially conical shell, wherein the cross slide may be connected to the shell by a plurality of rod ties. It is preferable that the cross slide be connected to the shell by six rod ties arranged with an identical step along corresponding surfaces of the cross slide and the shell.

In order to reduce the weight of the construction, the shell may be made in the form of a plurality of annular conical sectors or in the form of a plurality of shaped sectors with a conical side surface and with a shaped nonlinear generatrix.

In order to effectively adjust the compression of the first spring means, the stopper, placed on the first end of the rod, may be made in the form of a thread on the rod and a nut screwed thereon.

In a particularly preferable embodiment of the invention, the sleeve may be provided with six structural ribs placed with an identical step along the external surface of the sleeve.

In order to enhance the air-tightness of the plug, annular seals of elastic material may be placed between the spacer and the plate and between the rod and the spacer.

The objects in accordance with the following aspect of the invention are achieved by means of a plug for the chamber of a liquid-propellant rocket engine, comprising an axial rod, one end of which is made with a thread and is provided with a nut, means for tracking a profile of walls of the chamber, made in the form of a sleeve secured on the rod at the end opposite to the end with the thread and provided with radial structural ribs with spring-loaded levers which are hinge-secured at ends of the ribs and have rollers on one of the ends thereof, wherein each lever is placed with the possibility for contact of the roller with a wall of the chamber, a stop means, movably mounted on the axial rod and comprising a cross slide and a shell, wherein the stop means is positioned with the possibility for interaction with the tracking means, a sealing valve movably mounted on the axial rod and comprising a spacer, movably placed on the rod, a plate secured to the spacer, and a seal, positioned along the peripheral portion of the plate, springs disposed along the axial rod between the nut and the spacer and between the spacer and the cross slide.

In an particularly preferable embodiment of the invention, the sleeve is provided with six radial structural ribs placed with an identical step along the external surface of the sleeve.

It is desirable that the seal be made in the form of a sealing ring from elastic material.

In order to enhance the seal between the spacer and the plate, and between the rod and the spacer, additional annular seals are disposed which are made from an elastic material.

It is most preferable that the elastic material of the seal be rubber.

BRIEF DESCRIPTION OF THE DRAWINGS

The invention will be better understood from the further comprehensive description of the preferable embodiment of the invention, which does not limit the invention, with reference to the accompanying drawings, wherein.

BEST MODE OF CARRYING OUT THE INVENTION

Figure 1:
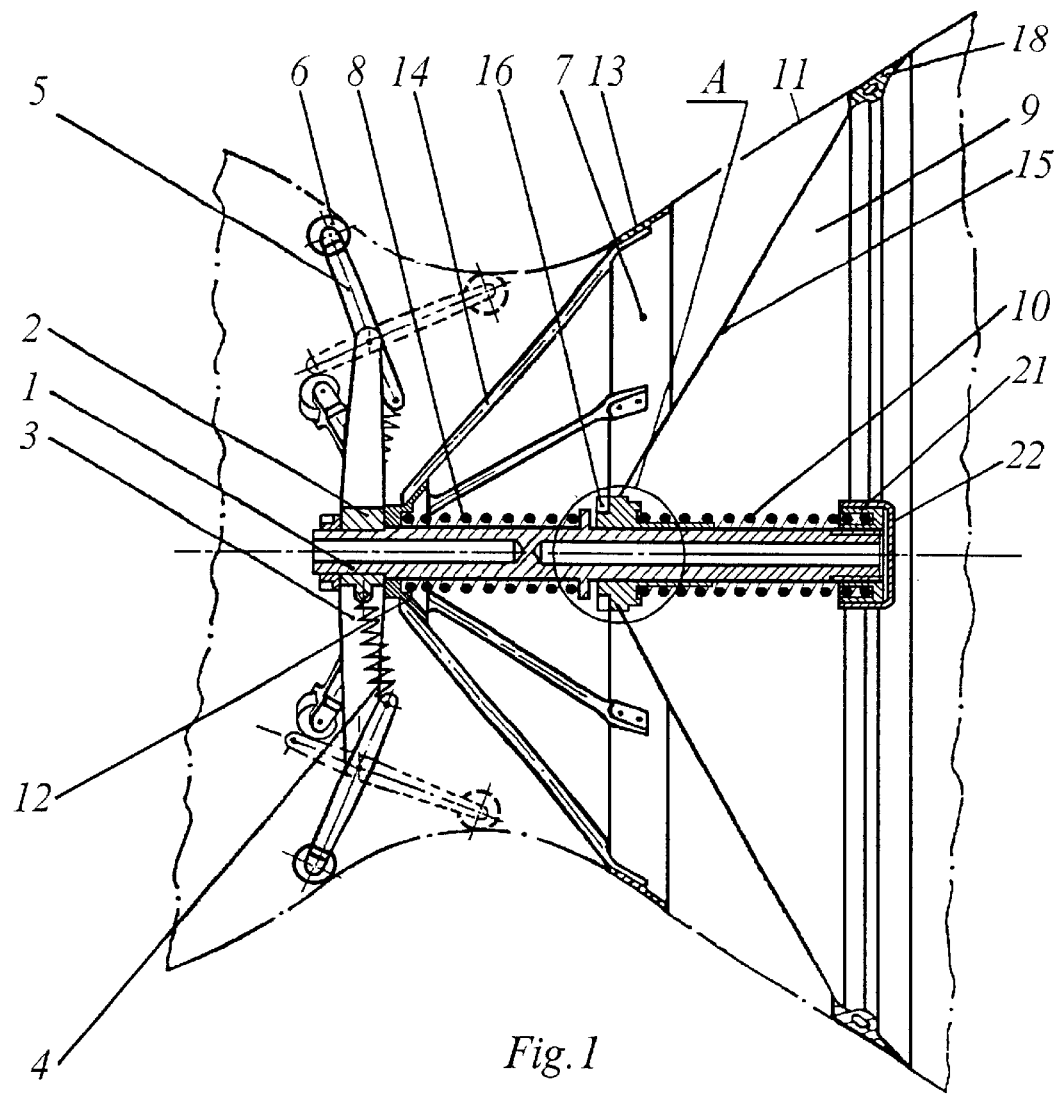
FIG. 1 shows a general view (sectional) of a plug for a chamber of a liquid-propellant rocket engine.

FIG. 1 shows a plug which is mounted in a throat section of a chamber 11 of a liquid-propellant rocket engine. The plug comprises an axial rod 1 having a first end with a stopper and a second end. The rod is positioned substantially along the longitudinal axis of the plug.

A valve means is positioned on the rod 1 with the possibility of sliding. The valve means may move from a closed position in which the chamber 11 is cut off into an open position in which the chamber 11 is open for the passage of a fluid medium (fuel and oxidizer vapors, and also gas blown through the chamber 11) through the chamber 11.

Figure 2:
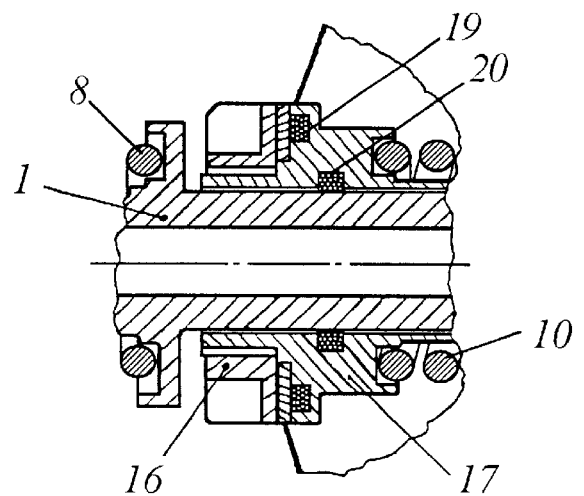
FIG. 2 shows magnified part A of FIG. 1.

In the preferable embodiment of the invention described here, the valve means is made in the form of a sealing valve 9. The sealing valve 9 is a metal (for example, stamped), substantially conical plate 15, fastened by a nut 16 on a spacer 17 (FIGS. 1, 2). The spacer 17 is mounted on the rod 1 with the possibility of sliding.

A sealing ring 18 of elastic material, for example rubber, is put in interference on the peripheral part of the plate 15.

Annular seals 19 and 20 of elastic material are used to seal the valve 9 in the region of contact of the plate 15 with the external diameter of the rod 1 and in the region in which the annular section of the plate 15 is secured on the spacer 17.

It is clear to a specialist in this field of engineering that the sealing valve may be made in other known modifications of a two-position valve.

In order to spring-load the sealing valve 9, a first spring means (spring 10 in the preferable embodiment of the invention being described) is placed between the valve 9 and the stopper. In order to adjust the compression of the spring 10 in the embodiment of the invention being described, the stopper is made in the form of a thread on the rod and a nut 21 screwed onto the thread.

In order to protect the walls of a nozzle of the combustion chamber against possible damage when the plug is blown out, a cover 22 of elastic material, for example rubber, is put on the nut 21 (FIG. 1).

A stop means is slidably mounted on the rod 1 downstream of the valve means in the direction toward the second end of the rod 1. The stop means may occupy a stop position (FIG. 1) in which it interacts with the walls of the chamber 11, and a free position in which the stop means does not interact with the walls of the chamber 11.

In the present embodiment, the stop means is made in the form of a limiter 7. The limiter 7 performs the part of a stop in the chamber 11 and is a nondetachable assembly unit comprising a cross slide 12 and a conical shell 13, wherein the slide 12 is connected to the shell 13 by a plurality of rod ties 14 (FIG. 1).

In this embodiment of the invention the number of rod ties 14 is equal to six, wherein the ties are placed with an identical step over the corresponding surfaces of the slide and shell. It is understood by any specialist in this field of engineering that the number of rod ties may change. The number of ties equal to six has been selected from the point of view of convenience in centering the limiter 7.

The minimum number of rod ties should be three. With a lesser number of rod ties it is difficult to achieve the necessary degree of centering.

The maximum number of ties may be limited only by considerations of advisability. The embodiment with six ties is sufficiently efficient, and therefore there is no necessity to increase that number in the future.

The shell 13 may be made split, for example, in the form of several annular conical sectors or in the form of shaped sectors with a conical side surface and with a shaped nonlinear generatrix, i.e. the generatrix of the shell may not necessarily be straight. This is done in order to lighten the construction.

It is obvious to a specialist in this field of engineering that other embodiments and modifications of the stop means are possible within the limits of the scope of the patent claims. It is only important that the stop means in one of its positions interact (without the possibility of its further displacement towards the second end of the rod 1) with the walls of the chamber.

A second spring means (spring 8) is placed on the rod 1 between the valve means and the stop means. This spring means interacts with the valve means and with the stop means and spring-loads them.

Means for tracking the profile of the walls of the chamber is stationarily mounted on the rod 1 near its second end. The tracking means is in constant interaction with the walls of the chamber, wherein the means for tracking the profile of the chamber walls is placed with the possibility for interaction with the stop means.

In the embodiment of the invention being described, the tracking means comprises a sleeve 2, stationarily secured on the rod 1 and provided with structural ribs 3, which are directed in a radial direction from the sleeve 2.

In the instant embodiment of the invention, the number of structural ribs is equal to six. However, it is understood by any specialist in this field of engineering that the number of structural ribs may change. The number of structural ribs equal to six has been selected from the point of view of convenience in centering the sleeve 2.

The minimum number of rod ties should be equal to three. With a lesser number of rod ties it is difficult to achieve the necessary degree of centering.

The maximum number of structural ribs may only be limited by considerations of advisability. The variant with six ribs is sufficiently effective, and therefore there is no necessity to increase this number in the future.

A corresponding lever 53 (in its middle part) is hinge secured at the end of each structural rib. Wherein, a first end of each of the levers 5 is provided with a roller 6 and is positioned with the possibility of contact between the roller and a wall of the chamber 11 (FIG. 1).

Each lever 5 is spring-loaded by means of a corresponding spring means (spring 4), wherein a first end of each spring 4 is secured on the sleeve 2, and a second end of each spring 4 is secured to a second end of a corresponding lever 5 for contact between the roller 6 on the first end of the lever 5 with the walls of the chamber 11.

The device operates in the following manner. The plug is inserted into the chamber to a stop of the limiter 7 at the chamber 11 casing using a mounting fixture (boom with a handle not shown in the drawing) screwed into the threaded hole of the rod 1 from the side of the protective cover 22. Under the action of the axial load of the mounting fixture, the axial rod 1 moves forward along the axis of the chamber 11 casing (in FIG. 1 to the left), overcoming the action of springs 4, 8, 10. The levers 5 are rolled on the rollers 6 towards the chamber axis along its internal walls, spring-loaded and in the extreme position of the limiter 7 (at a stop) are arranged under the action of the springs 4 in the position shown in FIG. 1 by the dashed line. Then the mounting fixture is relieved of the axial load, and the fixture is removed. Under the action of spring 8 the axial rod 1 moves along the chamber axis backwards (in FIG. 1 to the right) to a position balanced by the mutual action of springs 4, 8, 10. The plug is self-mounted in the working position.

The sealing valve 9 closes and seals the engine chamber 11 by means of the annular seals 19, 20 and the sealing ring 18. The valve 9 is spaced from the wall of the chamber 11 casing under the action of the blow gases, and the positive pressure is released from the internal cavities of the engine. Wherein, the axial rod 1 maintains a stable position coaxial with the chamber, making it possible for valve 9, under the action of an axial load arising from a pressure drop on the valve, to move along the rod 1, opening and closing the flow section of the chamber. When the pressure of the gas in the chamber increases, the gas acts on the surface of the plate 15, wherewith the spring 10 is compressed. As a result of this the plate 15 moves back, and gas is released from the internal cavity of the chamber.

After the start, under the action of increasing gas pressure, the plate 15 moves even further back, pulling the entire device along with it, and the plug is blown out of the chamber nozzle.

By adjusting the compression of the spring 10 with the nut 21, it is possible to simultaneously open the valves on all of the chambers of a multichamber engine. This is very important in order to ensure its normal start.

The use of spring-loaded means in the plug for tracking the shape of the walls of a chamber makes it possible to carry out multiple mounting and dismounting of the plug without use of complicated special mounting fixtures. This substantially simplifies the fulfillment of these operations, reduces expenditures and enhances the efficiency of the device.

This plug is mainly designed for sealing the cavity of LRE chambers. However, a specialist understands that it may also be used as a sealing device in aggregates used in the most diversified fields of industry.

When the proposed invention is used, the air-tightness of an LRE engine is ensured when there is a pressure drop thereon from the side of the environment within the range of from 0 to 0.3 atm, releasing the positive pressure from the internal cavity of the chamber, and ensuring the blow out of the plug from the nozzle, with a force which does not exceed 35 kg, and serviceability at temperatures from −40° C. to +50° C.

A specialist in this field of engineering will understand that many modifications of the proposed device are possible which are within the limits of the inventive concept and do not extend beyond the scope of the patent claims defined by the appended set of claims.

What is claimed is:

1. A plug for a liquid-propellant rocket engine chamber nozzle, the plug comprising:

an axial rod having a first end with a stopper and a second end, wherein the rod is positioned substantially along a longitudinal axis of the plug;

a system for maintaining the plug in a nozzle throat, said system comprising a sleeve fixedly attached on said second end of said axial rod, a plurality of structural ribs extending in a radial direction from said sleeve, a plurality of spring-loaded levers each being securely hinged on an end of a respective one of said structural ribs and a plurality of rollers each arranged on an end portion of a respective one of said levers, said levers being positioned for causing contact of said rollers with a wall of said nozzle throat;

a movement limiter comprising a cross slide movable on said axial rod for interaction with said sleeve of said maintaining system, a shell and a plurality of structural elements connecting said cross slide and said shell; and a sealing valve comprising a disc slidably mounted on said axial rod, a first loaded spring positioned on said axial rod between said stopper and said disc and a second loaded spring positioned between said disc and said cross slide.

2. A plug according to claim 1 wherein said first end of said axial rod is provided with a threaded hole, and further comprising a bar with a threaded end portion for connecting with said threaded hole in said axial rod to install said plug in the nozzle throat.

3. A plug according to claim 1 further including a slidably mounted spacer, and said disc being fixedly attached to said spacer.

4. A plug according to claim 1 wherein said disc is substantially conical.

5. A plug according to claim 1 further comprising a seal formed of an elastic material and arranged around the circumference of the disc.

6. A plug according to claim 5 wherein said seal has a cup-like shape which is tightly fitted on said disc.

7. A plug according to claim 6 wherein said elastic material of said seal is rubber.

8. A plug according to claim 7 further comprising additional seals of an elastic material in an area proximate contact surfaces of a spacer and said axial rod and in an area proximate contact surfaces of said disc and said spacer.

9. A plug according to claim 8 wherein said elastic material is rubber.

10. A plug according to claim 1 wherein said shell has the shape of a truncated cone.

11. A plug according to claim 10 wherein said shell is made of metal.

12. A plug according to claim 1 wherein said stopper comprises a thrust nut.

13. A plug according to claim 1 wherein said plurality of ribs includes six structural ribs spaced uniformly around the external surface of said sleeve.

14. A plug according to claim 1 wherein said structural elements are rods.

* * * * *

UNITED STATES PATENT AND TRADEMARK OFFICE
CERTIFICATE OF CORRECTION

PATENT NO.   : 6,289,671 B1
DATED        : September 18, 2001
INVENTOR(S)  : Matvei Mikhailovich Makarov It is certified that error appears in the above-identified patent and that said Letters Patent is hereby corrected as shown below:

Title page,
Item [73], Assignee, delete "Otkrytoe Aktsionernoe Obschestvo "Nauchno-Proizvodstvennoe Obiedinenie "Energomash" Imoni Akadeimka Kaksolmika V.P. Glushko"" insert -- Otkrytoe Aktsionernoe Obschestvo "Nauchno-Proizvodstvennoe Obiedinenie "Energomash" Imeni Akadeimka Kaksolmika V.P. Glushko -- .

Signed and Sealed this

Twenty-sixth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,289,671 B1  Page 1 of 1
DATED : September 18, 2001
INVENTOR(S) : Matvei Mikhailovich Makarov It is certified that error appears in the above-identified patent and that said Letters Patent is hereby corrected as shown below:

<u>Title page,</u>
Item [73], Assignee, replace "…Imoni Akademika Kaksolmika V. P. Glushko" with -- …Imeni Akademika V.P. Glushko --.

Signed and Sealed this

Sixth Day of June, 2006

JON W. DUDAS
*Director of the United States Patent and Trademark Office*